US006575428B1

(12) United States Patent
Stier et al.

(10) Patent No.: US 6,575,428 B1
(45) Date of Patent: Jun. 10, 2003

(54) FUEL INJECTION VALVE

(75) Inventors: Hubert Stier, Asperg (DE); Dieter Maier, Isle of Palms, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,269

(22) PCT Filed: May 18, 2000

(86) PCT No.: PCT/DE00/01593

§ 371 (c)(1),
(2), (4) Date: Apr. 19, 2001

(87) PCT Pub. No.: WO93/18299

PCT Pub. Date: Sep. 16, 1993

(30) Foreign Application Priority Data

Jun. 18, 1999 (DE) ........................................ 199 27 899

(51) Int. Cl.[7] ................................................ F16K 31/02
(52) U.S. Cl. ................................ 251/129.15; 239/585.1
(58) Field of Search ........................... 239/585.1, 585.3, 239/585.4; 251/129.15

(56) References Cited

U.S. PATENT DOCUMENTS

| | | | | |
|---|---|---|---|---|
| 5,642,862 A | | 7/1977 | Wakeman et al. | |
| 4,597,558 A | * | 7/1986 | Hafner et al. | 239/585.1 |
| 4,971,254 A | | 11/1990 | Wieczorek et al. | |
| 5,209,408 A | * | 5/1993 | Reiter | 251/129.15 |
| 5,285,969 A | * | 2/1994 | Greiner et al. | 239/585.1 |
| 5,875,972 A | * | 3/1999 | Ren et al. | 239/585.4 |
| 6,131,826 A | * | 10/2000 | Teiwes | 239/585.1 |
| 6,170,763 B1 | * | 1/2001 | Fuchs et al. | 239/585.1 |

FOREIGN PATENT DOCUMENTS

| | | |
|---|---|---|
| DE | 39 16 459 | 11/1990 |
| GB | 1 309 824 | 3/1973 |
| WO | WO 93 18299 | 9/1993 |

* cited by examiner

*Primary Examiner*—David A. Scherbel
*Assistant Examiner*—John Bastianelli
(74) *Attorney, Agent, or Firm*—Kenyon & Kenyon

(57) ABSTRACT

A fuel injector for fuel-injection systems of internal combustion engines in which a guide disk is provided upstream of a valve seat, the guide disk fulfilling several functions. In addition to guiding an axially movable valve needle, the guide disk takes on a flow-through function for the fuel. To this end, a passage hole having alternating guide regions and flow regions over its outer circumference is provided in the guide disk, the opening width of the passage hole defined by the guide regions being smaller than the opening width defined by the flow regions. The fuel injector is particularly suitable for use in fuel-injection systems of mixture-compressing internal combustion engines with externally supplied ignition.

11 Claims, 2 Drawing Sheets

FUEL INJECTION VALVE

RELATED ART

Figure 1:
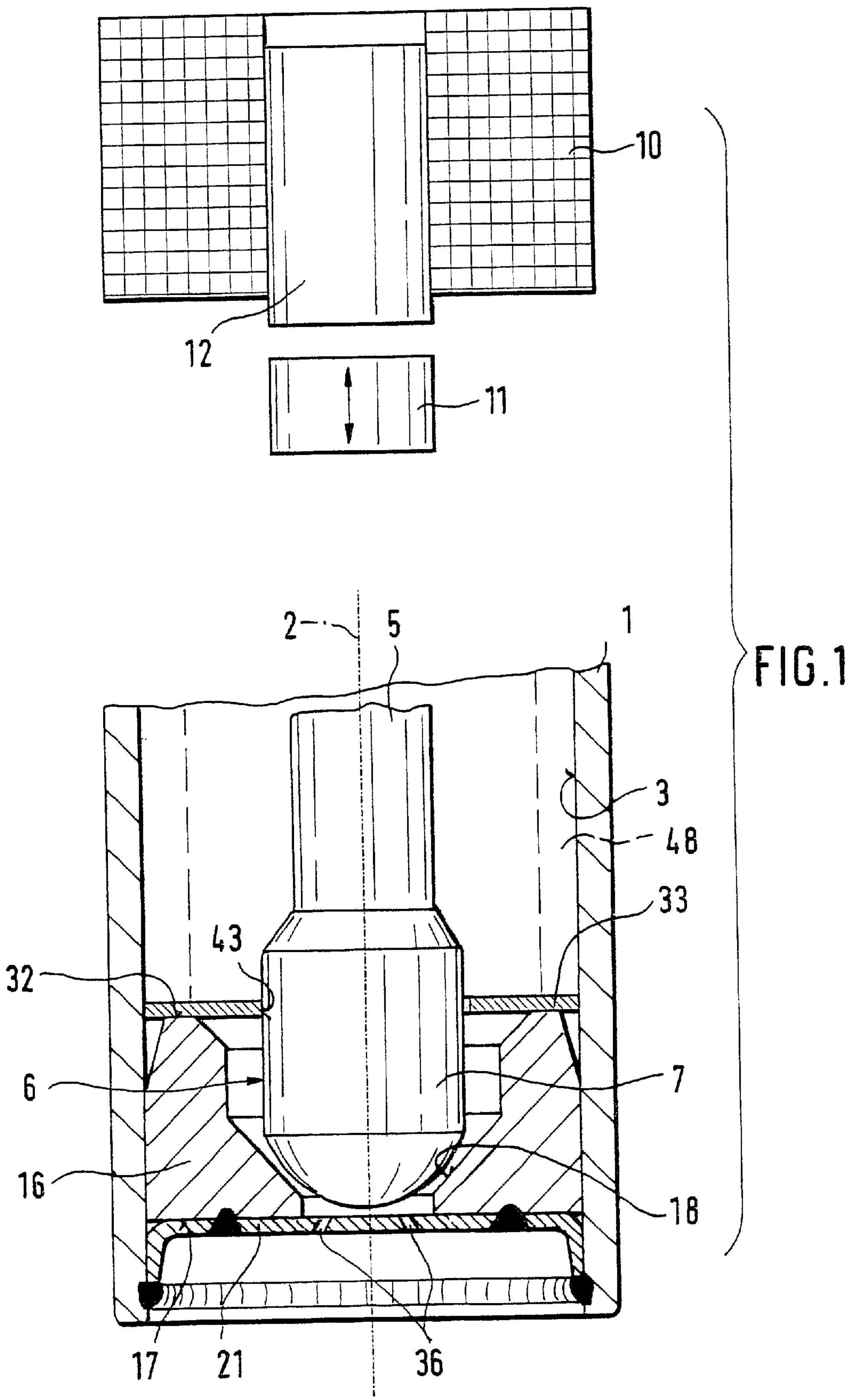

The present invention is based on a fuel injector according to the species defined in the main claim.

World Patent WO 93/18299 already describes a fuel injector having a valve seat body on which a guide element rests which possesses a central passage opening through which a valve needle can move axially. This inner passage opening in the guide element is manufactured very accurately with small tolerances since the axially movable valve needle is guided in it. Outside of this central passage opening, a plurality of passage openings is produced in the guide element to permit passage of flow which have a circular form themselves and which are uniformly arranged in the guide element in a circular shape. Therefore, the fuel flow route lies outside of the central passage opening.

At the upstream face of the guide element, a thin filter element is formed as an additional component. In this context, in a center, ring-shaped filter zone, countless circular filter openings are provided. The filter element completely covers the guide element with its passage holes.

Equally, it is already known from documents German Patent 39 16 459 A1 and U.S. Pat. No. 5,642,862 to provide a guide disk near the valve seat on injection valves, the guide disk having a central guide opening and flow openings lying outside of this guide opening.

ADVANTAGES OF THE INVENTION

The fuel injector according to the present invention having the characterizing features of the main claim has the advantage of achieving a functional integration in a simple manner which is attained by a simplified manufacturability and a reduced number of manufacturing processes in a particularly inexpensive manner. According to the present invention, the functional integration is achieved in that in a component designed as a guide disk for axially guiding a valve needle only one opening is provided which is used both as guide opening and as flow opening.

Advantageous embodiments and improvements of the fuel injector characterized in the main claim are made possible by the measures specified in the subclaims.

The inner passage opening in the guide disk is advantageously made by punching. Thus, in doing so, an opening which both guides the valve needle and realizes the passage of the fuel is made in one process step. Further openings are not needed in the guide disk so that no additional manufacturing processes are required.

Since the guide disk takes a fixed position relative to the valve seat, a well-directed flow against the orifice plate is made possible which is not variable over the service life. When using the new guide disk, unlike valve needles having flow grindings on the circumference, no spray angle tolerances or flow tolerances occur which can disadvantageously arise in the case of the known valve needles because of the possible rotation and the changing relative position with respect to the spray openings during operation.

DRAWING

Exemplary embodiments of the present invention are shown in the drawing in a simplified manner and explained in greater detail in the following description.

Figure 2:
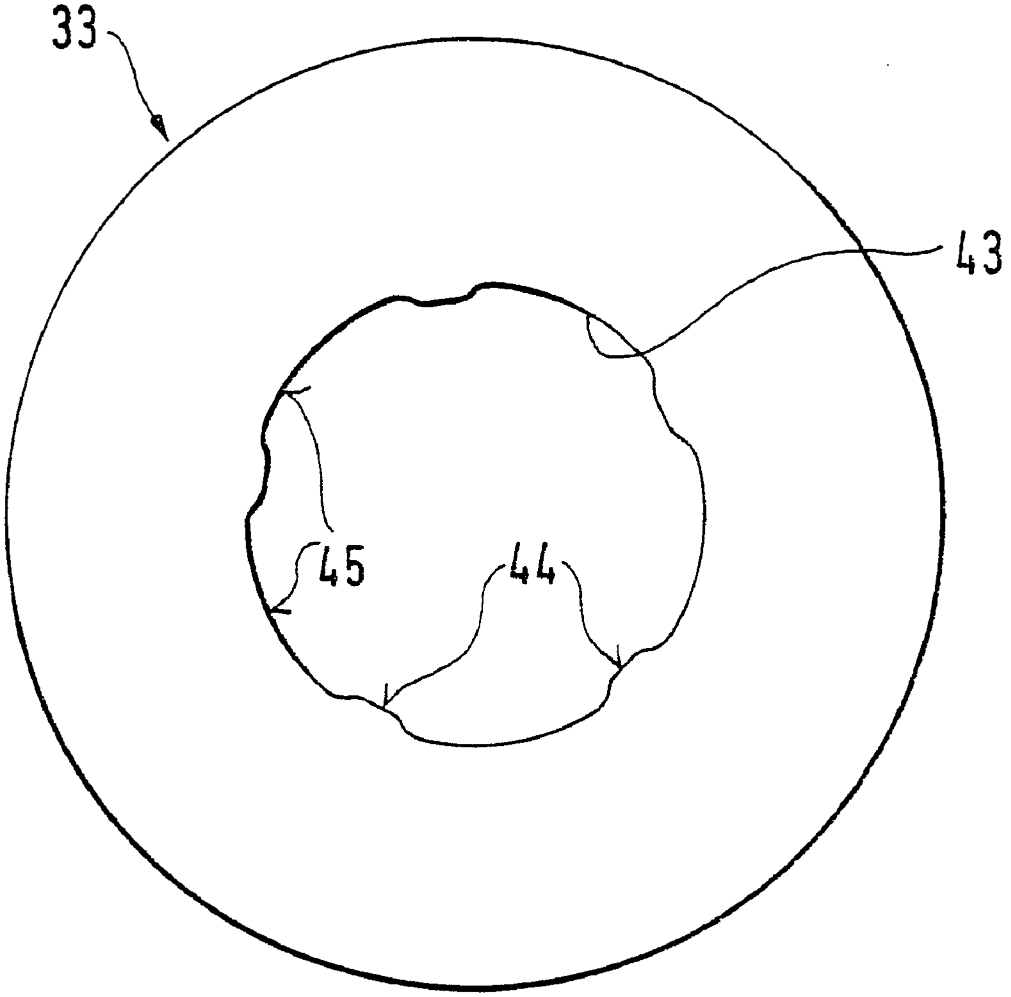

FIG. 1 shows a partially depicted fuel injector having a guide disk according to the present invention; and FIG. 2 shows a top view of a guide disk.

DESCRIPTION OF THE EXEMPLARY EMBODIMENTS

As an exemplary embodiment, a valve in the form of an injection valve for fuel-injection systems of mixture-compressing internal combustion engines with externally supplied ignition is partially depicted in FIG. 1. The injection valve has a tubular valve seat carrier 1 in which a longitudinal opening 3 is formed concentrically to a longitudinal valve axis 2. In longitudinal opening 3, an axially movable valve needle 5 is arranged which has a, for example, cylindrical valve closing member 7 at its downstream end 6.

The injection valve is actuated in a known manner, for example, electromagnetically. A schematically sketched electromagnetic circuit having a magnetic coil 10, an armature 11, and a core 12 is used for axially moving valve needle 5 and, consequently, for opening the injection valve against the spring force of a return spring (not shown) and for closing it, respectively. Armature 11 is joined to the end of valve needle 5 facing away from valve closing member 7, for example, via a welded seam by a laser, and aligned toward core 12.

In place of an electromagnetic circuit, it is also possible for the injection valve to be actuated piezoelectrically or magnetostrictively.

A valve seat body 16 is imperviously mounted by welding in the downstream end, facing away from core 12, of valve seat carrier 1 in longitudinal opening 3 running concentrically to longitudinal valve axis 2. At its lower face 17, facing away from valve closing member 7, valve seat body 16, which has a fixed valve seat 18, is concentrically and firmly joined to a, for example, pot-shaped orifice-plate 21.

Used to guide valve needle 5 or valve closing member 7 during the axial movement of valve needle 5 along longitudinal valve axis 2 is a guide disk 33 according to the present invention, which is joined, for example, to an upper face 32 of valve seat body 16 facing away from orifice plate 21. Cylindrical valve closing member 7, which has the contour of a spherical segment facing valve seat 18, cooperates with valve seat 18 of valve seat body 16, the seat narrowing in a truncated cone shape in the flow direction.

Orifice plate 21 possesses at least one, for example four spray orifices 36 formed by means of erosion, punching, or etching, for example. A holder edge of orifice plate 21 is bent conically outward, so that it rests against the inside wall of valve seat carrier 1 defined by longitudinal opening 3, a radial compression being present. Orifice plate 21 is joined to the wall of valve seat carrier 1, for example by welding, forming a seal.

The insertion depth of valve seat body 16 determines the magnitude of lift of valve needle 5. In this context, the one end position of valve needle 5, when magnetic coil 10 is not excited, is established by contact of valve closing member 7 with valve seat 18, while the other end position of valve needle 5, when magnetic coil 1 is excited, results from contact of armature 11 on the lower core end.

Guide disk 33 serves for radial guidance of valve needle 5 during its axial movement in longitudinal opening 3, to avoid excessive wear on valve seat 18, and to avoid asymmetric flow conditions between valve seat 18 and spray orifices 36. In addition, guide disk 33 also fulfills a flow-through function for the fuel, allowing it to get from the interior valve space upstream of guide disk 33 up to valve seat 18. Guide disk 33 has a thickness of approximately 80 $\mu$m to 150 $\mu$m. Usually, guide disk 33 is manufactured by means of punching, etching, or galvanic shaping (e.g., LIGA, MIGA technique).

FIG. 2 shows a top view of a guide disk 33 as a separate component part. In circular guide disk 33, provision is made for a central passage hole 43 whose shape deviates from a circular form. Seen over the circumference of passage hole 43, guide disk 33 has several guide regions 44 which are spaced from each other and which define a slightly larger diameter than the outside diameter of valve closing member 7 of valve needle 5. These dimensional differences result in a minimal play of approximately 10 μm.

Between guide regions 44 narrowing the opening width of passage hole 43, provision is made for flow regions 45 which are distributed over the circumference and which widen the opening width of passage hole 43. Thus, guide regions 44 and flow regions 45 are present in an alternating manner at the boundary edge of passage hole 43, seen over its circumference. Advantageously, three to six of those regions 44, 45 are formed, respectively. FIG. 2 shows a guide disk 33 having five guide regions 44 and flow regions 45, respectively.

The attachment of guide disk 33 takes place, for example, with four weld points which can be made with a laser, offset from one another by 90°. During the installation, guide disk 33 is centered relative to valve seat 18 using a pin which has a slightly larger diameter than valve closing member 7. In the centered state, guide disk 33 is pressed against face 32 of valve seat body 16 and subsequently attached, for example using resistance welding or laser welding. In the installed state, guide disk 33 rests, for example, against a sleeveshaped supporting element 48, which can be optionally installed, with its upper face, which is opposite valve seat body 16. However, it is also conceivable for guide disk 33 to be forced to engage on a step or a shoulder of valve seat carrier 1 via its upper face in its outer region in a similar manner as described in document U.S. Pat. No. 5,642,862. The fastening of valve seat body 16 in valve seat carrier 1 can also be carried out, for example by flanging, instead of welded seams.

Possible methods for connecting valve seat body 16 and guide disk 33 are, for example, laser welding, resistance welding, soldering or clamping. Inner passage hole 43 of guide disk 33 is made, for example, by punching.

What is claimed is:

1. A fuel injector for a fuel-injection system of an internal combustion engine, the fuel injector having a longitudinal valve axis, comprising:

a fixed valve seat;

a valve needle which is movable along the longitudinal valve axis, the valve needle including a valve closing member that cooperates with the fixed valve seat; and a guide disk situated upstream of the fixed valve seat having a central passage hole through which the valve needle can move axially and which guides the valve needle during its axial movement, the passage hole including alternating guide regions and flow regions over a circumference of the passage hole, an opening width of the passage hole defined by the guide regions being smaller than an opening width defined by the flow regions, the guide regions being raised with respect to the flow regions, the guide regions being projected into the passage hole.

2. The fuel injector of claim 1, wherein the guide disk is manufactured by galvanic shaping.

3. The fuel injector of claim 1, wherein the guide disk is manufactured from a sheet of metal.

4. The fuel injector of claim 1, further comprising:

a valve seat body in which the fixed valve seat is formed, the valve seat body having an upper face to which the guide disk is attached.

5. The fuel injector of claim 4, wherein the attachment of the guide disk and the valve seat body is achieved by one of welding, soldering and clamping.

6. The fuel injector of claim 1, wherein the passage hole of the guide disk includes at least three alternating guide regions and flow regions, respectively, which are formed over the circumference of the passage hole.

7. The fuel injector of claim 3, wherein the passage hole is manufactured by punching.

8. The fuel injector of claim 1, wherein the passage hole is the only opening in the guide disk.

9. The fuel injector of claim 1, wherein the guide disk has a thickness of approximately 80 μm to 150 μm.

10. The fuel injector of claim 1, wherein the guide disk is manufactured by etching.

11. The fuel injector of claim 4, wherein the guide disk and the valve seat body are connected by one of laser welding and resistance welding.

* * * * *

UNITED STATES PATENT AND TRADEMARK OFFICE

CERTIFICATE OF CORRECTION

PATENT NO. : 6,575,428 B1
DATED : June 10, 2003
INVENTOR(S) : Hubert Stier et al.

It is certified that error appears in the above-identified patent and that said Letters Patent is hereby corrected as shown below:

<u>Column 1,</u>
Line 3, change “RELATED ART” to -- FIELD OF THE INVENTION --
Line 4, change “is based on” to -- relates to --
After line 5, insert -- BACKGROUND INFORMATION --
Line 6, delete “already”
Line 23, change “Patent” to -- Published Application No. --
Line 23, delete “A1”
Line 27, change “ADVANTAGES” to -- SUMMARY --
Lines 29 and 30, delete “having the characterizing features of the main claim”
Line 56, change “DRAWING” to -- BRIEF DESCRIPTION OF THE DRAWINGS --
Line 60, change “depicted fuel” to -- depicted view of a fuel --
Line 61, after “according to” add -- an embodiment of --
Line 62, change “disk.” to -- disk according to an embodiment of the present invention --
Line 63, change “DESCRIPTION OF THE EXEMPLARY EMBODIMENTS” to -- DETAILED DESCRIPTION --
Lines 38-40, delete lines.

<u>Column 2,</u>
Line 6, delete “a”
Line 7, change “cylinder” to -- a cylinder --
Line 29, change “to a,” to -- to, --
Line 29, change “pot-shaped” to -- a pot-shaped --
Line 30, change “Used” to -- According to the present invention, a guide disk 33 is used --

Signed and Sealed this

Twenty-ninth Day of June, 2004

JON W. DUDAS
*Acting Director of the United States Patent and Trademark Office*